Nov. 9, 1926.
C. A. WARD
1,606,547
MOTOR VEHICLE
Filed July 21, 1923
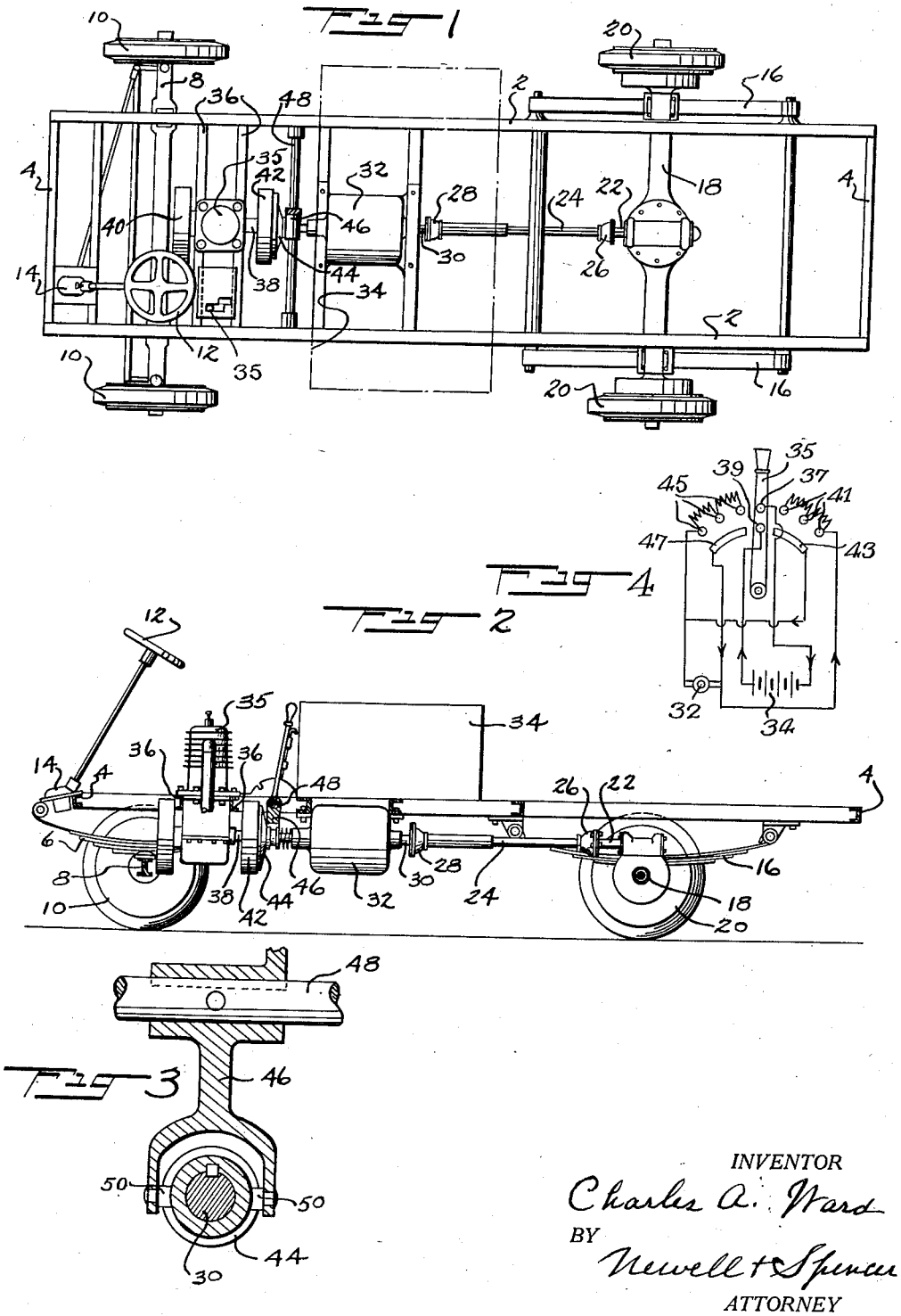
INVENTOR
Charles A. Ward
BY
Newell & Spencer
ATTORNEY Patented Nov. 9, 1926.

1,606,547

UNITED STATES PATENT OFFICE.

CHARLES A. WARD, OF MOUNT VERNON, NEW YORK.

MOTOR VEHICLE.

Application filed July 21, 1923. Serial No. 652,907.

This invention relates to motor vehicles and more particularly to vehicles of the type arranged to be propelled electrically.

The primary objects of the invention are to improve the construction and mode of operation of motor vehicles of the electrical type and to produce a vehicle of this character which may be run with greater efficiency and economy than the usual electrically propelled vehicle at present in commercial use.

With this object in view, a feature of the present invention consists in the provision in a vehicle arranged for electrical propulsion, of a hydrocarbon motor and connections between the motor and the driving mechanism of the vehicle for driving the vehicle. This motor is preferably arranged so that under certain conditions it will furnish the sole driving power for the vehicle and also so that the hydrocarbon motor may be connected with the driving mechanism while the electric motor by which the vehicle is normally driven is connected with the driving mechanism, the hydrocarbon motor then acting as an auxiliary to the electric motor drive.

The above and other features of the invention will be readily understood from the accompanying drawings illustrating the invention in their preferred form, and the following detailed descriptions of the construction therein shown.

In the drawings—

Fig. 1 is a plan view illustrating the chassis and driving mechanism of a vehicle embodying the present invention;

Fig. 2 is a view in longitudinal vertical section of the vehicle;

Fig. 3 is a detail sectional view illustrating the clutch controlling mechanism, and Fig. 4 is a diagrammatic view illustrating the electric motor control mechanism.

The chassis of the vehicle illustrated in the drawings of the present application comprises the usual frame consisting of longitudinal channel bars 2 and cross bars 4 connecting the longitudinal bars at the ends thereof. The front end of this frame is supported upon front springs 6 and front axle 8 secured to said springs to the ends of which axle are pivoted the usual wheel spindles. Upon these wheel spindles are mounted the front wheels 10 which are actuated to steer the vehicle from a steering wheel 12 through the steering gear indicated generally at 14. The rear end of the chassis frame is supported upon rear springs 16 and rear axle housing 18 attached to the springs within which housing rotates the rear axle connected with the driving wheels 20. The rear axle is driven through a differential gearing from a shaft 22 which in turn is driven from a shaft 24 through a universal joint 26. The shaft 24 is driven through a universal joint 28 from a shaft 30 constituting the main shaft of an electric motor indicated at 32. The current for driving this motor is supplied from a storage battery 34 supported on the frame of the vehicle.

The control mechanism for throwing the electric motor into and out of operation and for varying the speed of the same may be of any suitable or convenient construction. Figure 4 of the drawings illustrates diagrammatically one arrangement of motor, battery, resistances and hand controller which may be employed. In the arrangement shown in this figure, the current through the motor is controlled by a pivoted controller lever 35 carrying contact buttons 37 and 39 which, when the controller is swung to the right from neutral position in which it is shown in Figure 4, engage respectively contact studs 41 and contact block 43 to place the motor in circuit with the battery to drive the truck in a forward direction. When the controller is swung to the left from neutral position, the contact buttons 37 and 39 engage respectively the contact studs 45 and contact block 47 to place the motor in circuit with the battery to drive the truck in a reverse direction. The several contact studs 41 and 45 are connected by suitable resistances to vary the speed of the motor as the controller lever is swung past the contact studs.

In the present form of the invention, the auxiliary hydrocarbon motor for driving the vehicle is indicated at 35 and is supported upon cross bars 36 of the vehicle frame. This motor may be of the one cylinder type as shown or it may embody any desired number of cylinders and may be constructed to develop any horse power desired. The motor is provided with a main or crank shaft 38 upon the forward end of which is mounted a fly wheel 40.

To enable the hydrocarbon motor to be connected with the driving wheels a clutch is provided for connecting the crank shaft 38 of the hydrocarbon motor with the shaft 30 of the electric motor. This clutch as shown is of the friction clutch type tho other types may be used and comprises a clutch member 42 fixed to the shaft 38 of the hydrocarbon motor and a cooperating clutch member 44 mounted on the shaft 30 of the electric motor. The latter clutch member is fixed to rotate with the shaft 30, but is movable longitudinally of said shaft into and out of engagement with the clutch member 42. The position of the clutch member 44 is controlled by a lever 46 fixed to a shaft 48 mounted to turn in bearings secured to the side bars 2 of the vehicle frame. The lower end of the lever 46 which is forked as shown in Fig. 3, embraces a central cylindrical projecting portion of the clutch member 44 and carries studs 50 engaging in a groove in this projecting portion of the clutch member.

With the above construction, the hydrocarbon motor may be readily connected to the driving mechanism of the vehicle. When it is desired to supplement the power of the electric motor with the power of the hydrocarbon motor the circuits for driving the electric motor are closed and the clutch 42, 44 for connecting the hydrocarbon motor with the driving mechanism is engaged at the same time. This will give the vehicle a very powerful drive and will enable it to be run at a greatly increased speed over that at which it is normally driven by the electric motor alone. The use of the hydrocarbon motor as an auxiliary to the electric motor will be of great advantage in operating the vehicle upon hilly roads as it will enable the vehicle to climb steep hills rapidly and with a great reduction in the consumption of battery current. When it is desired to drive the vehicle by the electric motor alone the clutch 42, 44 for connecting the hpdrocarbon motor with the vehicle driving mechanism is disengaged. When it is desired to drive the vehicle by the power of the hydrocarbon motor alone, the circuit for the electric motor is disconnected and the clutch 42, 44 is engaged. The vehicle may be driven over level stretches in this manner at a comparatively fast speed by a motor of relatively low power. The vehicle may be driven in this manner very economically as the battery current is entirely saved except possibly for the very small current required for the motor ignition, lights, etc.

The electric motor in this installation is arranged to serve as a starter for the hydrocarbon motor. When the electric motor is running the engagement of the clutch 42, 44 will start the hydrocarbon motor.

The provision of the hydrocarbon motor and connections between the same and the driving mechanism of the vehicle arranged in the manner described will enable the vehicle to be operated at an average speed considerably greater than the ordinary electric vehicle and this is an important consideration particularly when the vehicle is used for commercial purposes. The reduction in battery current used reduces the frequency with which it is necessary to recharge the battery thereby cutting down the recharging cost and increasing the life of the battery.

It is to be understood that the invention is not limited to the particular construction and arrangement of parts of the illustrated embodiment of the invention, but that the invention may be embodied in other forms within the scope of the claims.

Having explained the nature and object of the invention and having specifically described a construction embodying the invention in its preferred form, what is claimed is:

1. A motor vehicle, having in combination a vehicle body, wheels therefor, a main driving mechanism for driving the vehicle, comprising a high-powered storage battery arranged to be charged from an outside source, an electric motor of relatively high power, efficiency and torque, furnished with current from said battery, an auxiliary driving mechanism comprising a hydrocarbon motor of relatively low power, means for establishing driving connections between said motors and certain of the vehicle wheels without a variable speed transmission for driving the vehicle, and devices for throwing the electric motor and the hydrocarbon motor into and out of vehicle driving operation, independently at the will of the operator.

2. A motor vehicle, having in combination a vehicle body, wheels therefor, a main driving mechanism for driving the vehicle comprising a high-powered storage battery arranged to be charged from an outside source, an electric motor of relatively high power, efficiency and torque, furnished with current from said battery, an auxiliary driving mechanism comprising a hydrocarbon motor of relatively low power, means for establishing driving connections between said motors and certain of the vehicle wheels, without a variable speed transmission, for driving the vehicle, and devices under the control of the operator for throwing the electric motor into operation while the hydrocarbon motor is out of operation and for throwing the hydrocarbon motor into operation while the electric motor is out of operation, and for throwing both motors into operation at the same time.

Signed at New York, N. Y., this 10 day of July, 1923.

CHARLES A. WARD.